United States Patent [19]

Mouton

[11] Patent Number: 5,044,153

[45] Date of Patent: Sep. 3, 1991

[54] TURBOJET COMPRESSOR BLOW OFF VALVES WITH WATER COLLECTING AND DISCHARGE MEANS

[75] Inventor: Pierre C. Mouton, Grigny, France

[73] Assignee: Societe Nationale D'Etude et de Construction de Moteurs D'Aviation "S.N.E.C.M.A.", Paris, France

[21] Appl. No.: 446,813

[22] Filed: Dec. 6, 1989

[30] Foreign Application Priority Data

Dec. 15, 1988 [FR] France ................. 8816525

[51] Int. Cl.$^5$ ............................. F02K 3/02
[52] U.S. Cl. ................. 60/39.093; 60/226.1; 415/121.2; 55/306
[58] Field of Search ........... 60/39.091, 39.092, 39.093, 60/39.79, 39.8, 226.1; 415/121.2; 244/53 B; 55/306

[56] References Cited

U.S. PATENT DOCUMENTS

| | | | |
|---|---|---|---|
| 2,546,153 | 3/1951 | DeRemer | 55/306 |
| 3,436,910 | 4/1969 | Haworth | |
| 3,543,877 | 12/1970 | Ranvier | 415/121.2 |
| 3,638,428 | 2/1972 | Shipley et al. | 60/226.1 |
| 3,769,797 | 11/1973 | Stevens | 60/226.1 |
| 3,898,799 | 8/1975 | Pollert et al. | 60/226.1 |
| 3,964,257 | 6/1976 | Lardellier | 60/226.1 |
| 3,991,782 | 12/1976 | Scharzler | 244/53 B |
| 4,715,779 | 12/1987 | Suciu | 60/226.1 |

FOREIGN PATENT DOCUMENTS

| | | |
|---|---|---|
| 932500 | 3/1948 | France . |
| 1399565 | 4/1965 | France . |
| 2088303 | 1/1972 | France . |
| 2518169 | 6/1983 | France . |

*Primary Examiner*—Louis J. Casaregola
*Assistant Examiner*—John A. Savid, III
*Attorney, Agent, or Firm*—Oblon, Spivak, McClelland, Maier & Neustadt

[57] ABSTRACT

In a turbojet aero-engine of the bypass type in which the compressor includes pivotally mounted blow-off valves for discharging air from the primary air flow path through the compressor to prevent surging, the compressor further includes pivoted means associated with the blow-off valves such that the pivoted means lie against the wall of the primary air flow path whenever the valves are closed or are open below a predetermined angle of opening and, when said valves are opened beyond said predetermined angle, the pivoted means are caused to project into the primary air flow path for collecting excess water carried by the air and discharging this water from the flow path.

9 Claims, 6 Drawing Sheets

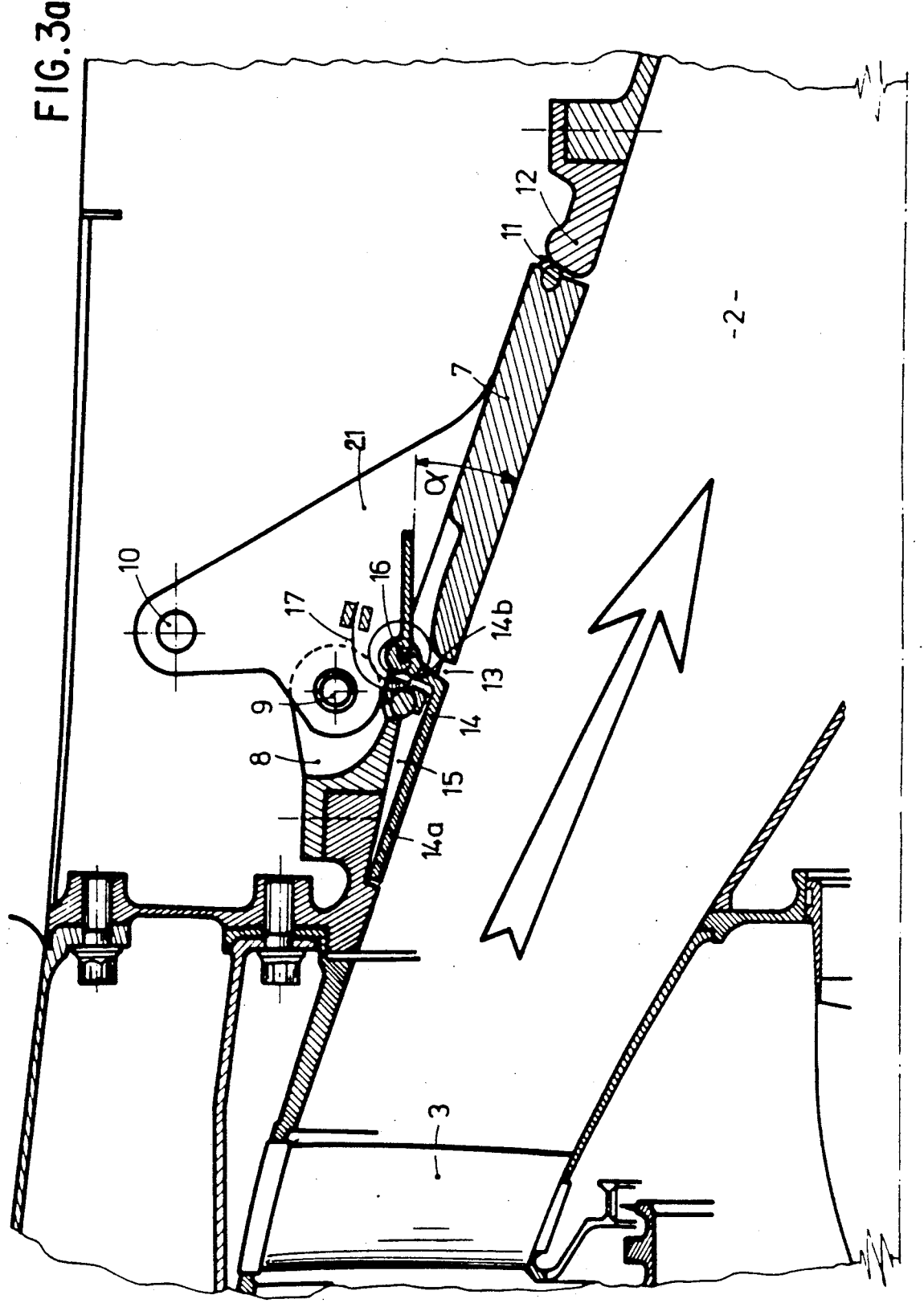

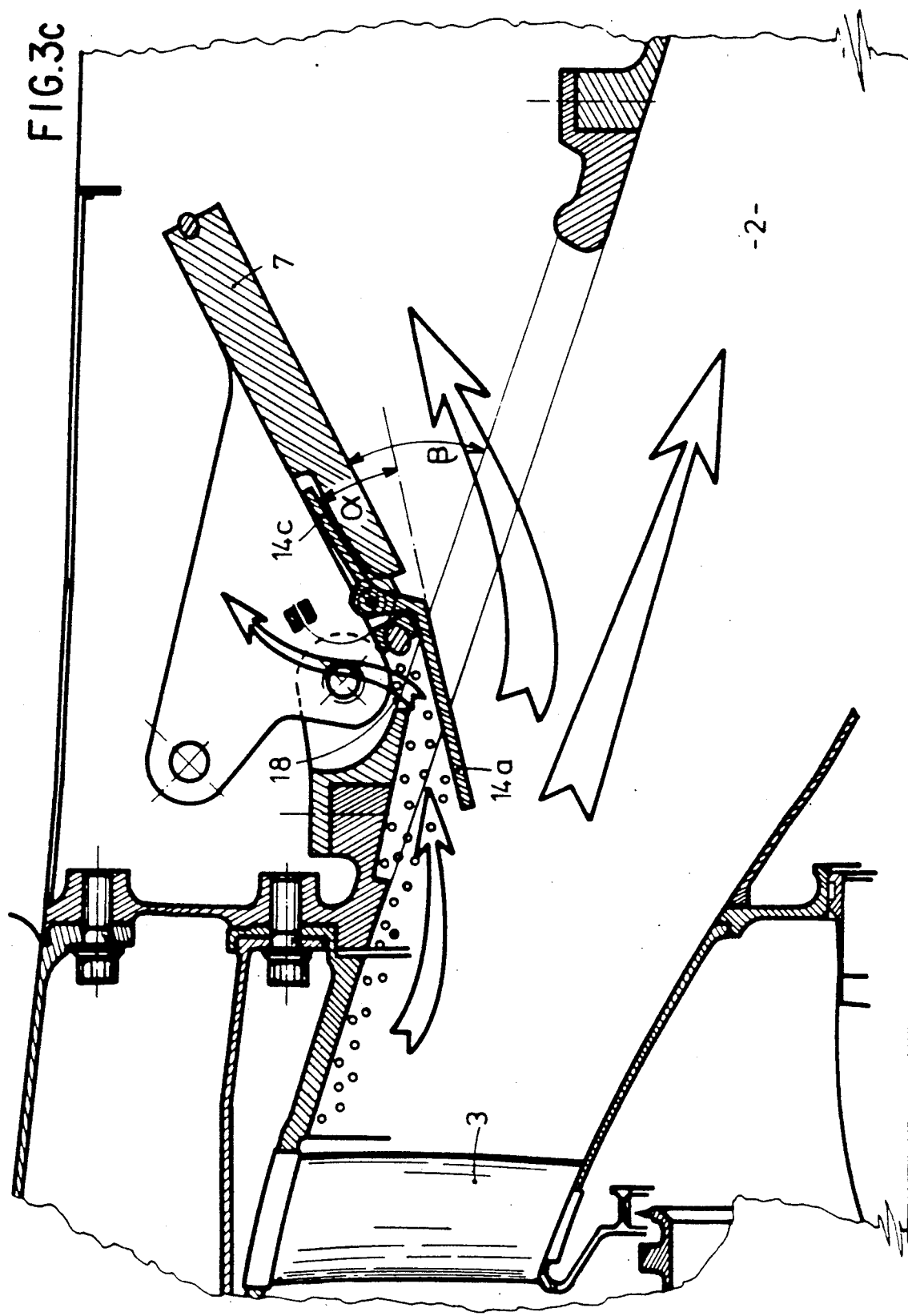

TURBOJET COMPRESSOR BLOW OFF VALVES WITH WATER COLLECTING AND DISCHARGE MEANS

BACKGROUND OF THE INVENTION

1. Field of the Invention

The present invention relates to turboshaft engines, and in particular to turbojet aero-engines of the bypass type.

Such a turboshaft engine conventionally comprises, proceeding from upstream to downstream in the direction of primary flow through the engine, an axial compressor supplying compressed air to a combustion chamber in which the air is mixed with pressurized fuel which is burnt to power an axial turbine which drives the compressor, the gases discharged from the turbine providing the thrust used for the propulsion of the engine.

Such turbojet engines of purely axial configuration take in at their front intake not only air required for operation but also, depending on climatic conditions, sand and/or water which can represent rather an impediment to their operation. This is particularly the case when an aircraft flies into a storm or through a large volume cloud such as a cumulus or cumulo-nimbus. Substantial quantities of water in the form of rain or hail can then enter the compressor. If the engine is at full throttle the water is vaporized and, even if it reaches the combustion chamber, the water is in the form of steam which is sufficiently hot and atomized not to extinguish the combustion chamber, which is supplied by a substantial flow of fuel.

Such is not the case, however, when an aircraft is descending, e.g. in the approach stage prior to landing. In this case, the engine is running slowly and the compression ratio of the compressor is relatively low, and water in the liquid or solid state, e.g. in the form of large drops or ice particles or even as "sheets of water", may reach the combustion chamber and extinguish the combustion of one of the burners, even all of them, or lead to the engine cutting out, the amount of fuel supplied being relatively low. However, this can happen only in exceptional cases where the weather conditions exceed the conditions taken into account when designing the engine.

In the majority of cases the sparking plugs may also be wetted and become temporarily useless. When extinguishing of the combustion chamber occurs, if the pilot is unable to leave the critical rain area, the engine(s) could then be fully stopped, with all the risks this would involve.

To prevent such situations it is imperative to get rid of as much as possible the water ingested before it reaches the combustion chamber, or, if it does reach the chamber, to make sure that it cannot put the burners out.

2. Summary of the Prior Art

Several means in the region of the combustion chamber may be used to do this, including water deflectors compelling the air to follow complex paths before entering the burners, paths which the water cannot follow because of its greater inertia.

Another way of preventing water from reaching the combustion chamber consists of exhausting the excess water at the exit of the low pressure compressor before the air charged with liquid or solid water enters the high pressure compressor.

The present invention is concerned with a way of achieving this, based on the existence of blow-off valves which are usually provided between the compressors of twin-flow and twin body turbojet engines. A peculiarity of these valves is that they are open when the engine is idling.

As shown in FIG. 1, which illustrates this arrangement in a conventional engine, these blow-off valves 1 are traditionally arranged in the duct 2 separating the low pressure compressor 3 from the high pressure compressor 4 and, when they are open, they create a discharge route 5 for part of the air flow compressed by the low pressure compressor towards the secondary flow path 6. This arrangement is operative when, in order to prevent the risk of possible surging of the low pressure compressor, it is necessary to allow a flow of air to pass through it greater than that which could be absorbed further downstream by the high pressure compressor. The excess air flow is therefore exhausted to the secondary flow path at a position between the low pressure compressor and the high pressure compressor.

It is found that this situation occurs when the turbojet engine is running at low speeds, and the opening behaviour of the blow-off valves is represented by curve A in FIG. 2. When the engine is idling and until it achieves a rotational speed close to one third of its speed at full throttle, the blow-off valves are fully open, their angle of opening reaching 45° or more. Their opening then reduces as the engine accelerates until the closed position is reached when moving from cruising speed to full throttle.

It is precisely the conditions in which these valves are open that the most dangerous water ingestion conditions are encountered. However the known valves, although they discharge air charged with water under these conditions, cannot bail out the water to a maximum extent as they have no part projecting into the flow path.

It is an object of the invention, therefore, to adapt these valves in a simple manner to enable them to collect more efficiently the particles of solid or liquid water centrifuged against the outer wall of the flow path, the centrifuging originating from the rotation effect imparted by the compressor Positioned upstream as well from the swan neck shape of the duct which contains the valve.

SUMMARY OF THE INVENTION

According to the invention there is provided in a turboshaft bypass engine, particularly a turbojet aero-engine of the bypass type, defining a primary air flow path and a secondary air flow path, said engine including in said primary air flow path a compressor having a casing wall delimiting a part of said primary flow path, a combustion chamber in which fuel is mixed with compressed air from said compressor and burned, and a turbine driven by gases from said combustion chamber and arranged to drive said compressor, said compressor including blow-off valves disposed in said casing wall so as to be pivotally adjustable between closed and open positions, said blow-off valves acting to discharge from said primary air flow path part of the air flow in said compressor when said valves are open, the improvement wherein said compressor also includes pivoted means associated with said blow-off valves such that said pivoted means lie against said casing wall whenever said blow-off valves are closed or are open below a predetermined angle of opening and, when said valves are opened beyond said predetermined angle of opening, said pivoted means are pivoted to project into said primary air flow path for collecting excess water carried by the air in said compressor and discharging said water from said primary air flow path.

Preferably said pivoted means comprise a pivotally mounted scoop associated with each of said blow-off valves, and return means for applying said scoop against said casing wall whenever said associated valve is closed or is open below said predetermined angle of opening, said scoop having an operating lever engaged continuously by said valve to pivot said scoop when said valve is open beyond said predetermined angle.

Further preferred features of the invention will become apparent from the following description of the preferred embodiments with reference to the accompanying drawings.

BRIEF DESCRIPTION OF THE DRAWINGS

FIGS. 3a to 3c are sectional views showing a blow-off valve and scoop in a first embodiment of the invention, and respectively show the valve and scoop closed, the valve open and scoop closed, and the valve and scoop open.

DESCRIPTION OF THE PREFERRED EMBODIMENTS

Figure 1:
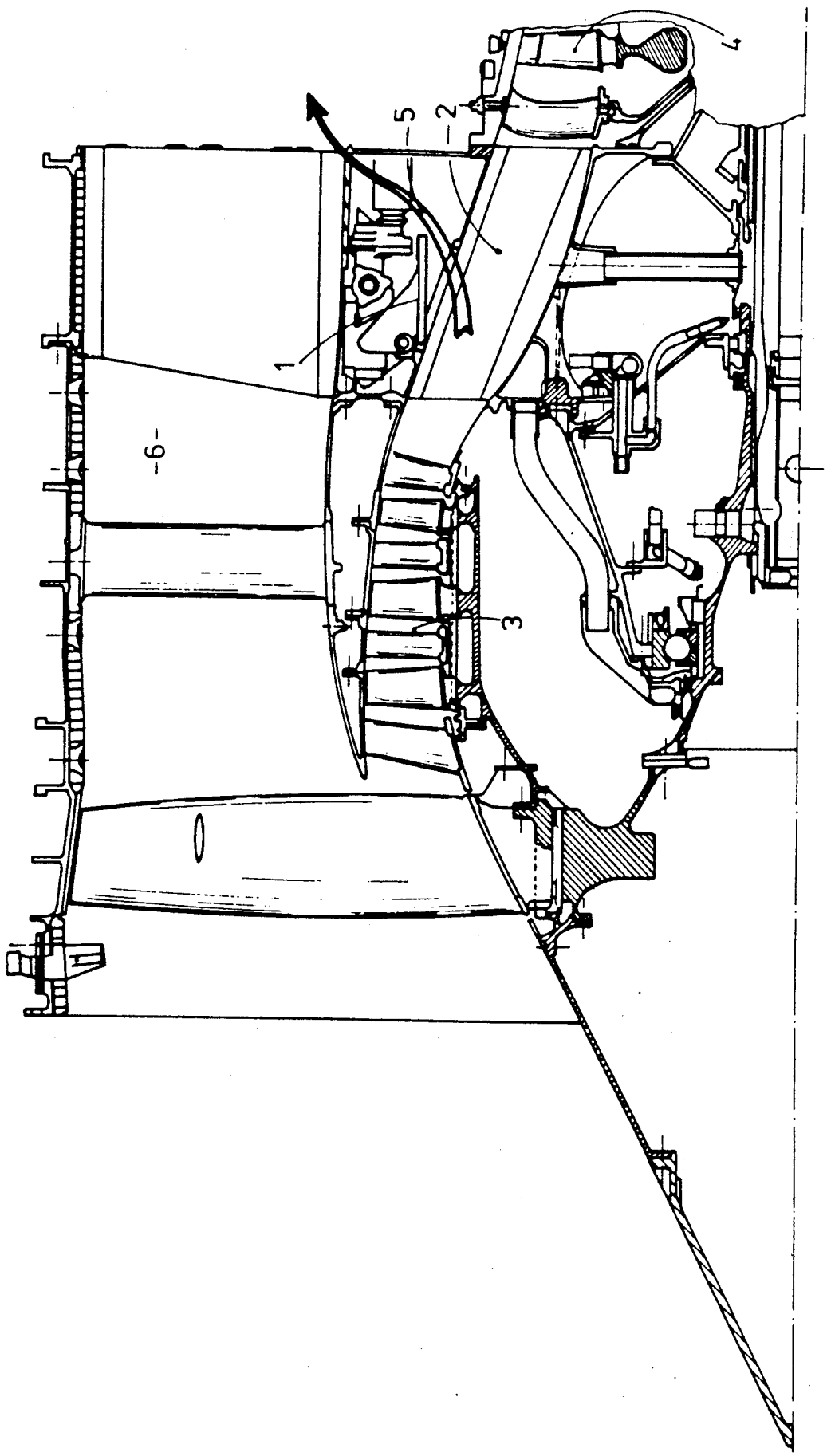
FIG. 1 is a longitudinal half section through part of a conventional turbojet bypass engine as described earlier, to which the invention may be applied.

With reference to FIG. 3a, which shows a part of one embodiment of a turbojet engine in accordance with the invention between the low pressure compressor, of which the last blading 3 can be seen, and the high pressure compressor, a blow-off valve 7 is shown hinged on a yoke 8 by means of an axle 9. The valve 7 may be operated by means of an actuator (not represented) or by a ring controlling several valves simultaneously, the actuator or the ring being connected to the valve by means of an axle 10 supported by a radial wing 21 of the valve.

In its closed state the valve is seated in an opening 11 in the casing 12 of the compressor and cooperates with a seal to close the opening. At its upstream part the valve is provided with a port 13 through which extends a scoop 14 having an upstream part 14a in the shape of a shovel and housed, in a rest position, in a recess 15 of the casing 12. The bent central Part 14b of the scoop passes through the port 13 of the valve and is hinged by means of an axle 16 on a yoke carried externally by the valve 7. Finally, the scoop 14 has an operating lever portion 14c extending downstream from the axle 16 outside the radially outer part of the valve 7. The lever part 14c is inclined at an angle $\alpha$ relative to the shovel part 14a of the scoop.

A return spring 17, cooperating in a conventional manner with the axle 16 and a part integral with the valve, biasses the scoop 14 towards the wall 12 of the casing so that, at rest, the inner face of the shovel part 14a of the scoop lies flush with the wall without projecting therefrom.

Figure 2:
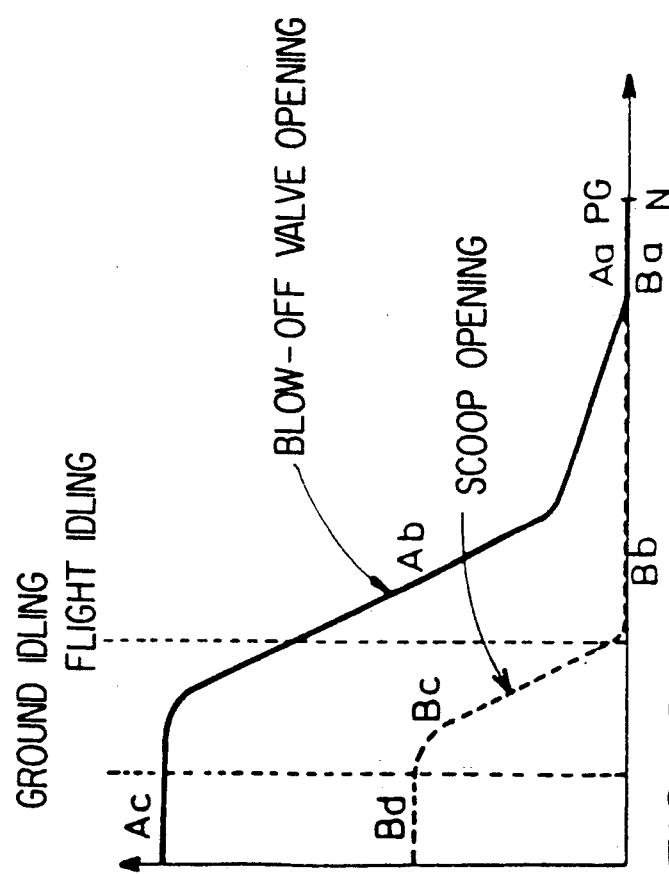
FIG. 2 is a diagram showing the opening angle of the blow-off valves as a function of the speed of rotation of the engine, and also showing the opening curve of the scoops which are provided in accordance with the invention.

At high rotational speeds of the turboshaft engine (full throttle) the valve and the scoop are in the positions shown in FIG. 3a, which corresponds to the common parts Aa,Ba of the curves A and B of FIG. 2, curve B being representative of the opening of the scoop. In this regime the whole of the air flow from the low pressure compressor is compressed by the high pressure compressor. The compression level at the output of the high pressure compressor and the temperature of the air flow are such that even if large amounts of water are ingested, this water is finely atomized and vaporized and mixed with a great quantity of air, making the risk of combustion failure very low, even non-existent.

Figure 3B:
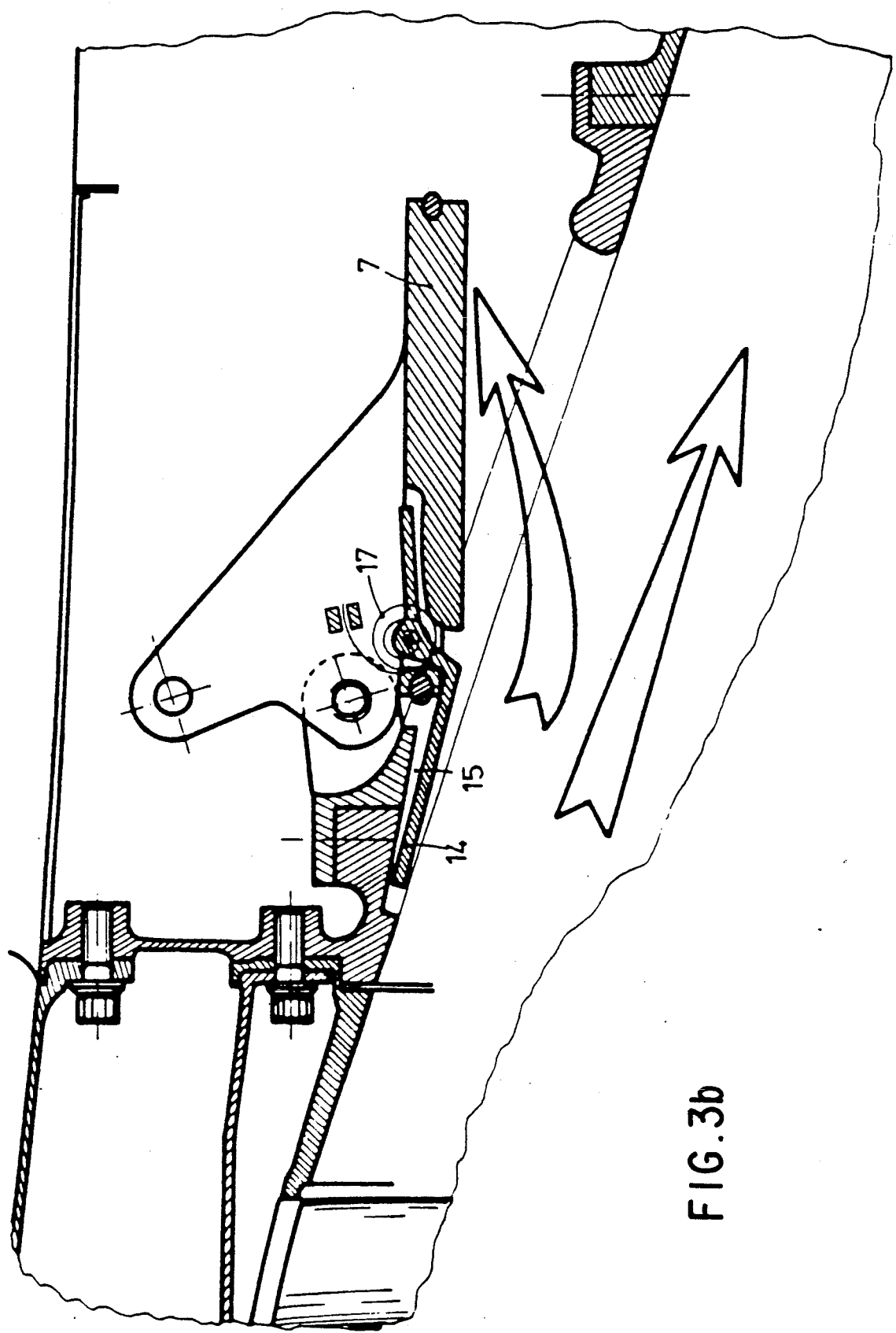

FIG. 3b shows the positions of the valve and scoop corresponding to the parts Ab and Bb of the opening curves of FIG. 2. These positions correspond to a lower rotational speed of the engine, at which the regulation of the engine controls the progressive opening of the blow-off valve to prevent the phenomenon of surging in the low pressure compressor. In this position the valve is opened to an intermediate angle, which may be 30° for a valve having a maximum opening of 45°. The temperature and the pressure of the air flow in the duct 2 are still sufficient for the problem of combustion failure in a damp medium not to arise. As a result the scoop remains biased by the spring 17 to its rest position in which the shovel portion 14a lies in its casing housing 15, since the opening angle of the valve does not exceed the angle which the control lever part 14c makes with the shovel part 14a. Thus, the scoop is not at this stage moved by the opening of the valve and does not produce any loss of head or distortion which could be detrimental to performance or engine stall margin.

In FIG. 3c the regulation has controlled the opening of the valve to an angle $\beta$ greater than the angle $\alpha$, which corresponds to parts Ac and Bc, Bd of the curves in FIG. 2. This situation corresponds to the conditions of engine idling in flight and on the ground, conditions where the danger of engine cut-out in a damp atmosphere is at its maximum.

As can be seen in FIG. 3c the control lever part 14c is engaged and pivoted by the valve 7 to cause opening of the scoop 14 so that its shovel part 14a projects into the primary flow path. In this configuration, the liquid water or the hailstones centrifuged against the wall 12 of the flow path are collected by the shovel part 14a and directed upstream thereof into the free space 18 between the opening 11 and the upstream region of the valve 7 before discharging into the secondary flow path.

It follows that the air reaching the high pressure compressor and the combustion chamber will have been cleared of all or part of its liquid or solid water constituents and, being drier, will reduce the risks of operational aberrations (cut-out or stall).

Figure 4:
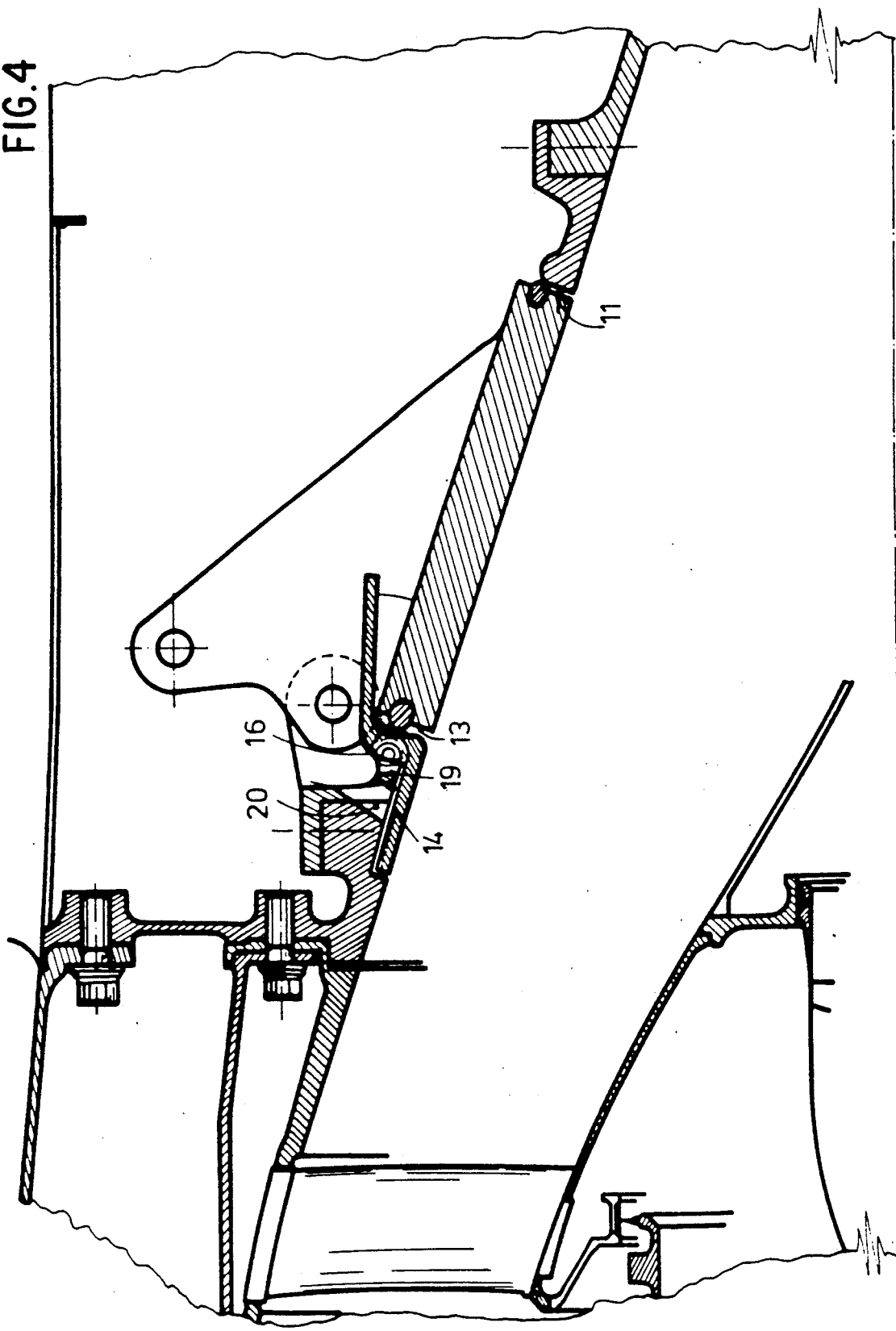
FIG. 4 is a view corresponding to FIG. 3a, but showing the valve and scoop closed in a second embodiment of the invention.

FIG. 4 illustrates an alternative embodiment of the invention, and all parts which are similar to parts of the first embodiment in FIGS. 3a to 3c will be referred to by the same reference numerals. In this alternative the scoop 14 is no longer supported by the valve 7, but by the casing 12 upstream of the valve 7. The hinge 16 of the scoop is provided on a yoke carried by the casing. Therefore, the valve does not have a port for the passage of the scoop, but instead the scoop is arranged in a housing 19 of the casing upstream of the opening 13.

The operation of this embodiment is identical to that of the foregoing, through holes 20 being provided in the casing for the passage of the air charged with liquid water or hail collected by the scoop 14 during operation. These holes are closed by the scoop 14 when the latter is biassed against the casing, and opened when the opening of the valve results in opening of the scoop.

In this way a reduction of the water content of the air flowing in the direction of the combustion chamber is achieved in a simple manner by means of an arrangement which does not lead to unnecessary losses of head for "fully shut" or intermediate opening positions of the valve before reaching the specific opening angle at which the scoop is actuated.

This particularly simple solution can also be fitted as a replacement for already existing equipment where problems of combustion extinction are likely to arise.

I claim:

1. In a turboshaft bypass engine, particularly a turbojet aero-engine of the bypass type, defining a primary air flow path and a secondary air flow path, said engine including in said primary air flow path a compressor having a casing wall delimiting a part of said primary flow path, a combustion chamber in which fuel is mixed with compressed air from said compressor and burned, and a turbine driven by gases from said combustion chamber and arranged to drive said compressor, said compressor including blow-off valves disposed in said casing wall so as to be pivotally adjustable between closed and open positions, said blow-off valves acting to discharge from said primary air flow path part of the air flow in said compressor when said valves are open, the improvement wherein said compressor also includes pivoted means associated with said blow-off valves such that said pivoted means lie against said casing wall whenever said blow-off valves are closed or are open below a predetermined angle of opening and, when said valves are opened beyond said predetermined angle of opening, said pivoted means are pivoted to project into said primary air flow path for collecting excess water carried by the air in said compressor and discharging said water from said primary air flow path.

2. A turboshaft engine according to claim 1, wherein said pivoted means comprise a pivotally mounted scoop associated with each of said blow-off valves, and return means for applying said scoop against said casing wall whenever said associated valve is closed or is open below said predetermined angle of opening, said scoop having an operating lever engaged continuously by said valve to pivot said scoop when said valve is open beyond said predetermined angle.

3. A turboshaft engine according to claim 2, wherein said return means comprises a spring which continuously biasses said scoop towards its position against said casing wall.

4. A turboshaft engine according to claim 2, wherein said casing wall is recessed to receive said scoop into said casing wall when said scoop is applied against said wall by said return means.

5. A turboshaft engine according to claim 2, wherein said scoop is mounted on said valve so that the pivot axis and said operating lever of said scoop are located adjacent the face of said valve external to said primary flow path, said valve having a port through which said scoop passes.

6. A turboshaft engine according to claim 5, wherein said water collected by said scoop when said scoop is pivoted into said primary flow path is discharged from said flow path through a space defined between the upstream edge of said valve and the upstream edge of an opening in the casing in which said valve seats when said valve is closed.

7. A turboshaft engine according to claim 2, wherein said scoop is mounted on said compressor casing wall upstream of said valve, said scoop having its pivot axis situated outside said casing wall and said operating lever facing an outer surface of said valve exterior to said primary flow path for engagement thereby when said valve opens beyond said predetermined angle.

8. A turboshaft engine according to claim 7, wherein said casing wall is provided with at least one opening upstream of said valve for the discharge of said water collected by said scoop when said scoop is pivoted into said primary flow path, said at least one opening being closed by said scoop when said scoop is applied against said casing wall.

9. A turboshaft engine according to claim 1, wherein the maximum opening angle of said blow-off valves is 45°, and said predetermined angle of opening beyond which said pivoted means are caused to project into said primary flow path is 30°.

* * * * *